United States Patent [19]

Gietman et al.

[11] 4,384,395

[45] May 24, 1983

[54] CORE SHAFT PULLER

[75] Inventors: Lambert J. Gietman; Paul J. Klemmer, both of Appleton, Wis.

[73] Assignee: Appleton Machine Company, Appleton, Wis.

[21] Appl. No.: 225,112

[22] Filed: Jan. 14, 1981

[51] Int. Cl.³ .............................................. B23P 19/04
[52] U.S. Cl. .......................................... 29/234; 242/81
[58] Field of Search ....................... 29/234; 242/81, 68

[56] References Cited

U.S. PATENT DOCUMENTS 3,995,747 12/1976 Lewey et al. ........................... 29/234

OTHER PUBLICATIONS

Appleton Machine Company, Bulletin RH-1230-SP.
British Machinery Bulletin, Aug. 1980.
Airfloat Corp., Brochure, Bulletin No. 106.
Brochure, American Scissor Lift.

*Primary Examiner*—James L. Jones, Jr.
*Attorney, Agent, or Firm*—McDougall, Hersh & Scott

[57] ABSTRACT

A portable core shaft puller includes a saddle for engaging the shaft and a clamp for locking the associated core during insertion or withdrawal of the shaft, an air motor for lateral displacement of the shaft and for positioning the core shaft puller relative to the shaft.

13 Claims, 9 Drawing Figures

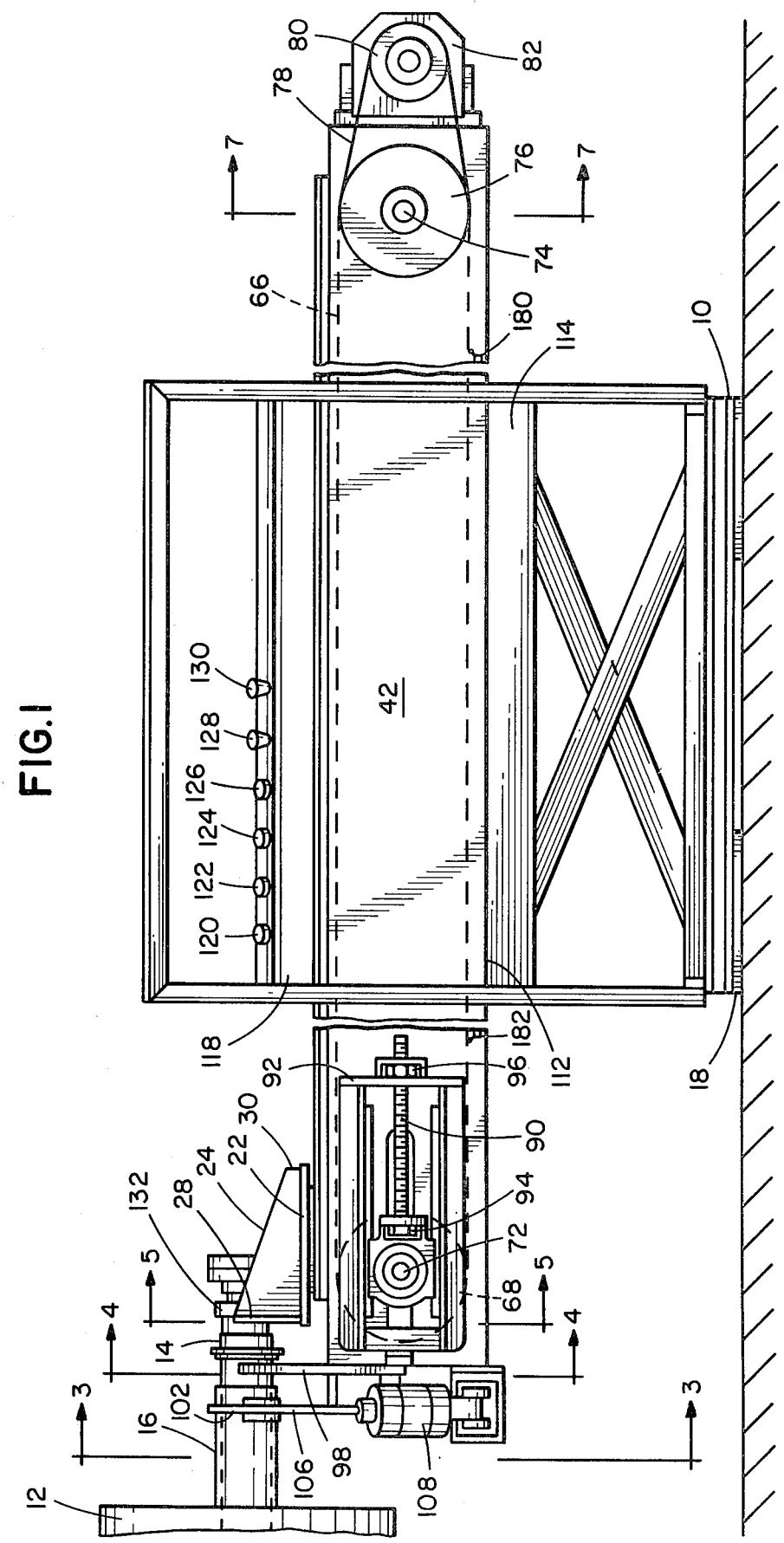

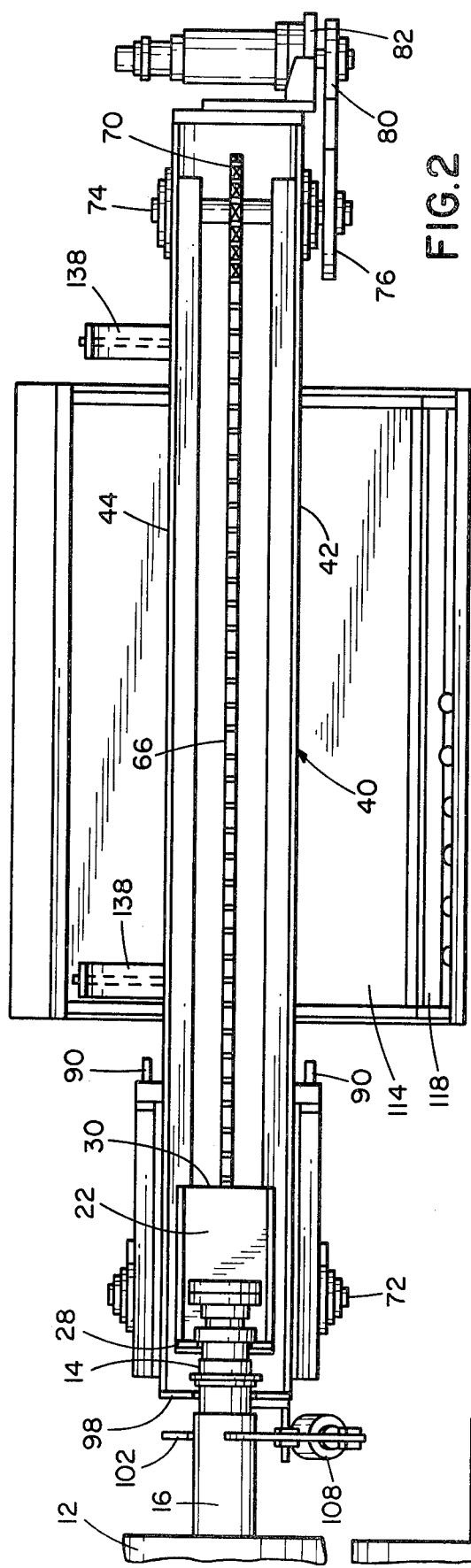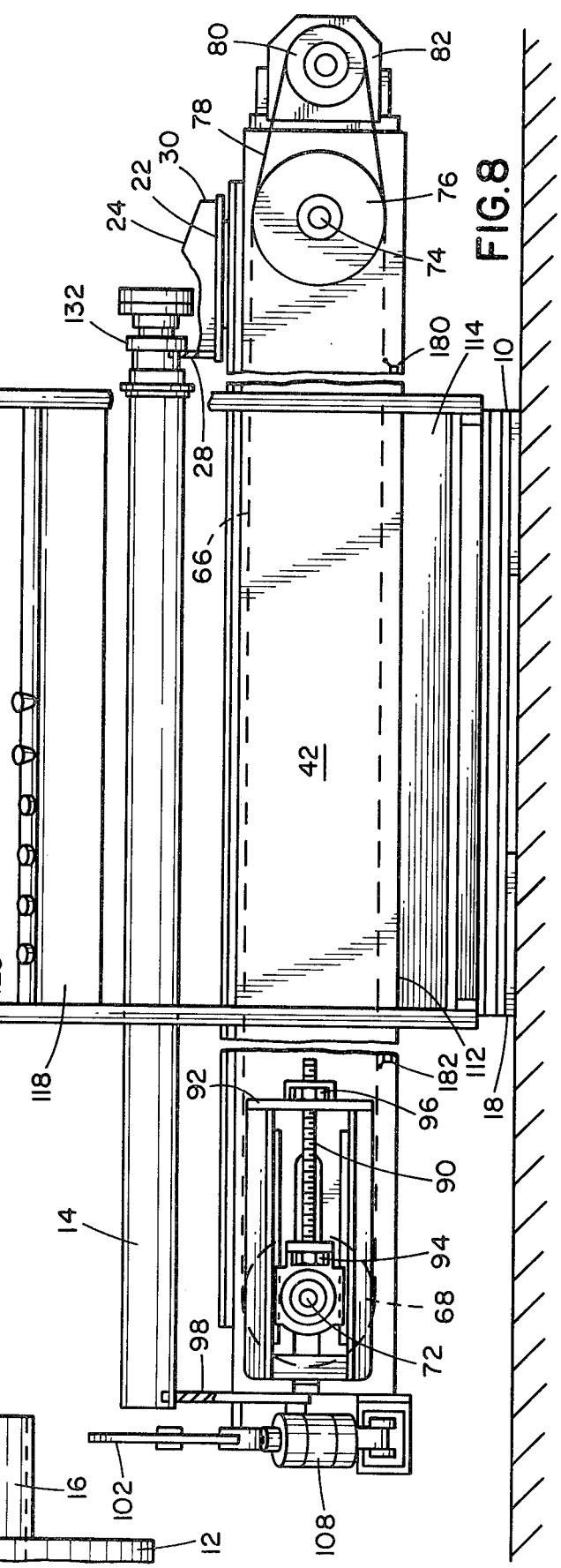

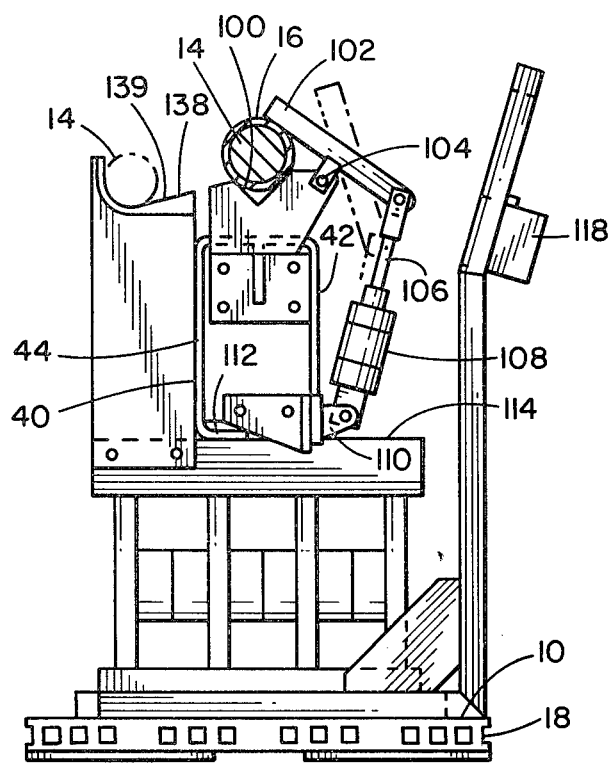
FIG.3
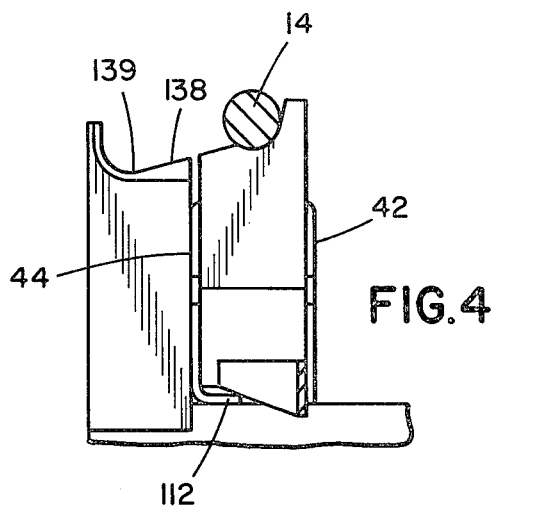
FIG.4
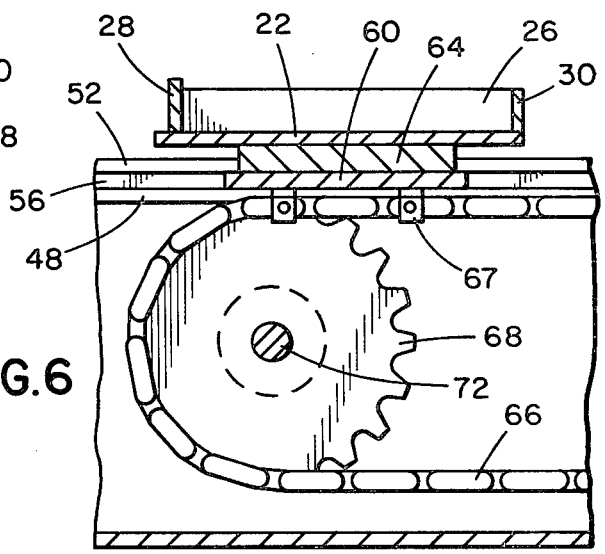
FIG.6
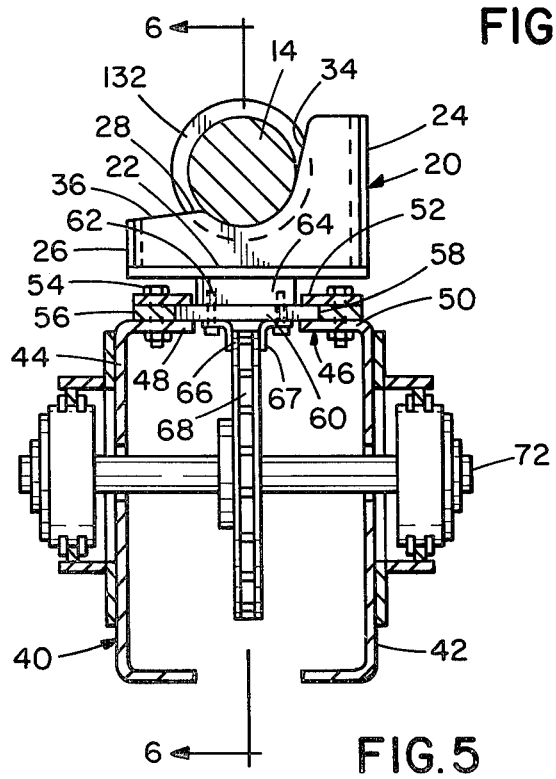
FIG.5
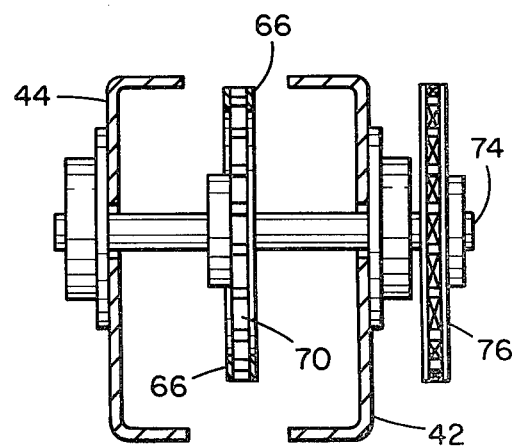
FIG.7

CORE SHAFT PULLER

This invention relates to core shaft pullers and it relates more particularly to shaft pullers of the type described which are movable for proper alignment with the roll of paper from which the core shaft is to be withdrawn and which is adjustable from the standpoint of height for alignment with the core shaft to enable more efficient use of the core shaft puller independent of the location of the roll and/or the size of the roll of paper wound on the core shaft.

To the present, use has been made of core shaft pullers mounted on an immovable fixture whereby, for removal of the core shaft from the roll, it becomes necessary to transport the core shaft with its heavy roll of paper to the puller and to adjust the vertical height of the roll of paper for proper alignment of the core shaft with the puller. This requires a considerable amount of labor and equipment as well as an excessive amount of time to effect proper alignment of the core shaft before withdrawal can be effected by the puller followed by additional time, effort and equipment for removal of the roll of paper from which the core shaft has been withdrawn so as to make the space available for subsequent use of the puller in the removal of core shafts from other rollers.

It has been found that much more efficient utilization of space, labor and equipment can be experienced by the use of a core shaft puller which is movable from station to station and adjustable in height for proper alignment with a core shaft for ease of pulling the core shaft and it is an object of this invention to provide a core shaft puller of the type described.

By the use of an adjustable and movable core shaft puller, more effective and efficient utilization can be made of the puller for shaft removal without the need for widely spacing the rollers from which the shafts are to be withdrawn thereby to permit the wound rolls to be spaced more closely one to the other for more efficient utilization of space and for more efficient flow of the material from the winding benches.

These and other objects and advantages of this invention will hereinafter appear, and for purposes of illustration, but not of limitation, an embodiment of the invention is shown in the accompanying drawings in which:

FIG. 1 is a side elevational view of the portable and adjustable core shaft puller embodying the features of this invention;

FIG. 2 is a top plan view of the core shaft puller of FIG. 1 showing the elements of the core shaft puller in the starting position;

FIG. 3 is a sectional view taken along the line 3—3 of FIG. 1;

FIG. 4 is a sectional view taken along the line 4—4 of FIG. 1;

FIG. 5 is a sectional view taken along the line 5—5 of FIG. 1;

FIG. 6 is an enlarged sectional view showing the connection between the saddle and the drive chain for displacement of the saddle during core shaft removal;

FIG. 7 is a sectional view taken along the line 7—7 of FIG. 1;

FIG. 8 is a view similar to that of FIG. 1, with parts removed to expose the core shaft puller at the end of its stroke for core shaft removal and with the removable support in lowered position.

Figure 9:
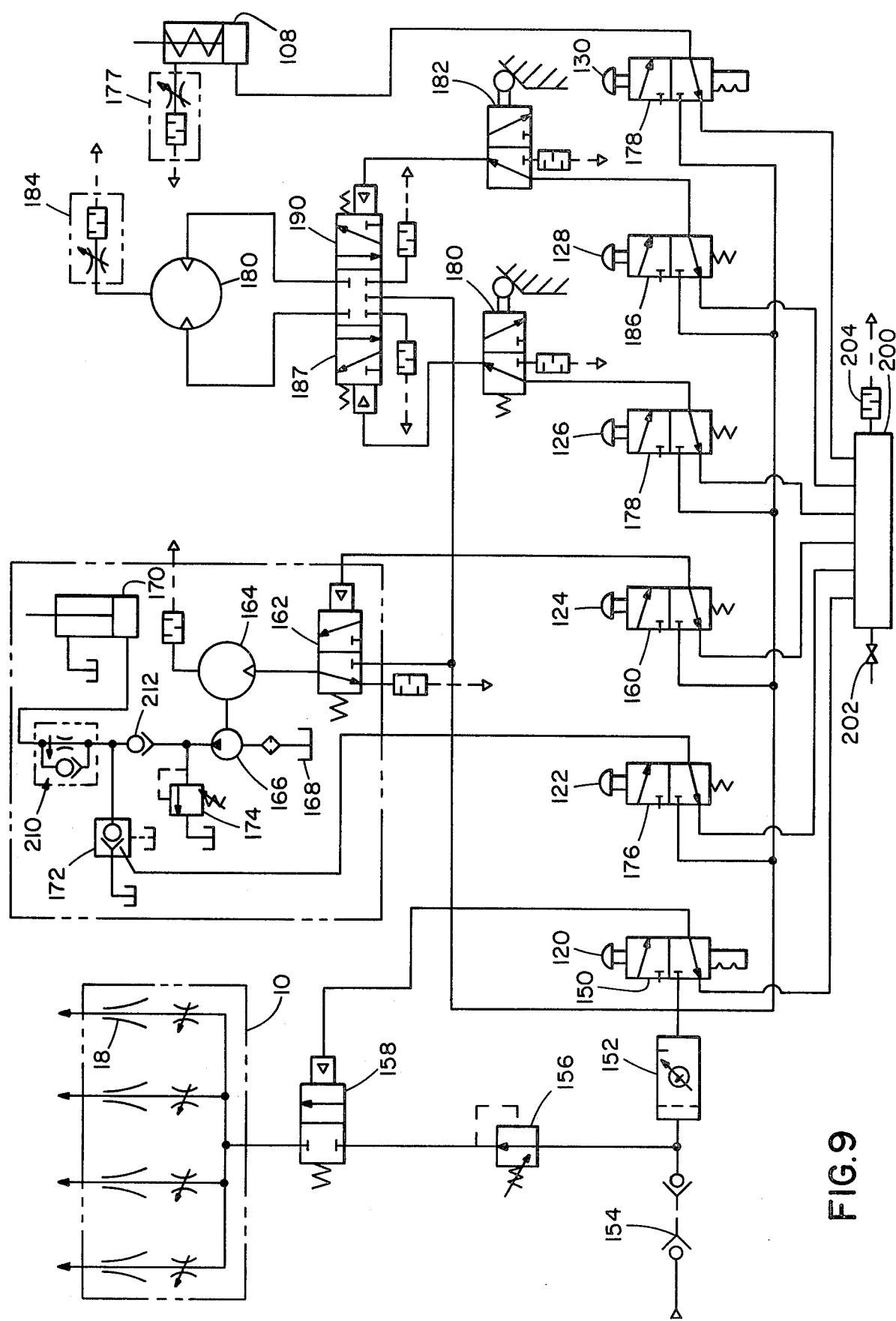
FIG. 9 is a schematic flow diagram of the controls for the operating elements.

Referring now to the drawings wherein like numerals refer to like parts, the core shaft puller of this invention is mounted on a pallet 10 of the type which enables easy movement over the floor in any direction to enable endwise alignment of the core shaft puller with the roll of paper 12 from which it is desired to remove the shaft 14 from the core 16.

In the illustrated modification, such flexibility in movement over the surface is achieved by mounting the core shaft puller on an air pallet 10 having a number of air casters 18 to cause the pallet to flow on a film of air for easy movement over the surface. Such air pallets are well known in the trade such as marketed by Airfloat Corp. of Decature, Ill. and by Aero-Go, Inc., of Seattle, Wash. Air casters equipped with four heavy duty air bearings can support loads of more than 50,000 pounds on an air film which enables transport without undue friction over smooth and even surfaces for endwise alignment of the platen with the roll from which the core shaft is to be withdrawn.

The core puller includes a saddle 20 formed with a horizontally disposed bottom wall 22, laterally spaced apart, vertically disposed side walls 24 and 26 and longitudinally spaced apart vertically disposed front and back walls 28 and 30 respectively. In the preferred modification, illustrated in FIG. 6 of the drawing, the side wall 24 extends to a higher level than the side wall 26 and the back wall 30 extends approximately to the level of the side wall 26. The front wall, which extends crosswise from the top of the side wall 24 to the top of the side wall 26, is contoured to provide a central curvilinear grooved portion 32, the base of which is at a level below the upper edge of the side wall 26, with one edge 34 extending curvilinearly upwardly to the upper edge of the side wall 24 while the other edge merges with an inclined portion 36 which extends from the upper edge of the side wall 26 to a level slightly above the level of the side wall 26 to define a rollway over which the shaft 14 can be displaced onto or off of the saddle.

The saddle 20 is supported on an elongate housing 40 in a manner to enable displacement of the saddle lengthwise of the housing between forward and retracted positions of adjustment. The housing includes vertically disposed, laterally spaced apart side walls 42 and 44 and a top wall 46 formed of flanged portions 48 and 50 which extend inwardly from the upper edges of the side walls for a distance to provide a parallel spaced relation therebetween. Fixed to the top side of each of the flanged portions 48 and 50 is an elongate guide plate 52 the inner edges of which are spaced one from the other by an amount to provide a spaced relation therebetween corresponding to and preferably slightly greater than the spaced relation between the inner edges of the flanged portions 48 and 50 of the housing. The guide plates 52 are secured to the flanged portions as by nut and bolt means 54 with a spacer 56 of lesser dimension in between to define a pair of elongate facing guide slots 58 between the inner edges of the guide plates and flanged portions of the housing.

The saddle 20 is mounted on a support plate 60 dimensioned to have a width greater than the spaced relation between the inner edges of the guide plates 50 and the flanged portions 48 and 50 of the housing but less than the spaced relation between the base portions of the facing guide slots 58 whereby the lateral edge portions of the support plate 60 are slidably engaged in the guide slots. The saddle is secured to the support plate, as by nut and bolt means 62 with a spacer block 64 in between dimensioned to have a width less than the spaced relation between the inner edges of the spacer plates 52 and a thickness sufficient to position the bottom wall of the saddle above the top wall 50 of the housing to clear the attachments thereto to enable lengthwise displacement of the saddle and its supports relative to the housing. Means are provided for interconnecting the support plate 60 and the chain 66 for conjoint movement therewith. In the illustrated modification, such means includes lugs 67 having flanged portions secured by the nut and bolt means 54 to the support plate 60 and depending portions connected to a link of the chain 66.

Displacement of the saddle 20 lengthwise between forward and retracted positions of adjustment along the housing can be effected by various actuating means. In the preferred modification illustrated in the drawings, use is made of a chain drive comprising an endless chain 66 operating about longitudinally spaced apart front and rear sprockets 68 and 70 fixed for rotational movement on front and rear shafts 72 and 74 respectively. Laterally spaced apart journals 76 on the front shaft 72 are supported by the housing side walls for free rotational movement, with the journals operating in elongate slots in the side walls to enable lengthwise displacement of the shaft 60 relative to the housing for adjustment of tension on the drive chains. Rear shaft 74 is supported by laterally spaced apart journals 76 fixed to the housing side walls with a portion of the rear shaft extending beyond the wall 38 for mounting a drive sprocket 76. The drive sprocket is connected by an endless chain 78 to the sprocket 80 of a reversible motor 82 fixed to the back wall of the housing for driving the chain 66 in one direction or the other.

Tension of the drive chains can be effected as by means of an "H" type takeup. Suitable tension adjustment means, shown in the drawings, includes an elongate screw 90 which communicates at one end with the front sprocket shaft 60 and at the other end with a crosswise extending plate 92 fixed to the housing. Nut members 94 and 96, on the through extending portions of the shafts, enable adjustment of the lengthwise position of the idler shaft 60. As previously described, the journals on the ends of the shaft 60 are slidably supported by the slotted side walls of the housing to enable endwise adjustment for tensioning the chain. Thus by turning the nut members 94 and 96 in one direction or the other, the distance between the crosswise extending brace member 92 and the shaft 60 can be increased or decreased to increase or decrease tension on the drive chain.

Means are provided at the forward end of the housing for clamping a core 16, when present on the shaft 14, to prevent withdrawal of the core concurrently with the withdrawal of the core shaft and for support of the core shaft during engagement by the saddle and during withdrawal of the core shaft from the roll. For this purpose, there is provided an upright support plate 98 rigid with the forward end of the housing, having a groove 100 extending downwardly from the upper edge for receiving the core and shaft portion extending beyond the roll 12. A clamping lever 102 is pivotally secured intermediate its ends on a pivot pin 104, fixed to the lateral upper edge portion of the upright 98. The clamping lever 102 is dimensioned to extend inwardly beyond the pivot 104 by an amount greater than the distance between the pivot and the grooved portion to enable the lever to engage the core 16 in clamping relation, while the other end of the clamping lever 102 is pivotally secured to the end portion of a piston rod 106 extending outwardly from a fluid cylinder 108, such as an air cylinder, pivotally secured at its base on a bracket 110 fixed to a spaced lower end portion of the upright plate 98. The clamping lever is adapted to be actuated by the air cylinder between clamping position, shown in solid lines in FIG. 3, and retracted position, shown in broken lines in FIG. 3.

The bottom wall 112 of the housing is secured to the top side of a platform 114 separated from the pallet 10 by elevator means for raising and lowering the platform relative to the pallet. Instead, the bottom wall can be secured directly to the elevator means for raising and lowering the housing. Various means known to the trade can be employed as the means for raising and lowering the housing relative to the pallet. In the preferred practice of this invention, use is made of a scissor lift housed in a box frame 114 in which the scissor members are actuated by an air motor. Such lift mechanisms are capable of providing for vertical travel of as much as 36 inches for height adjustment of the core shaft puller mechanism heretofore described. A suitable combined air float transporter and lift of the type described is marketed in the United States by "American Scissor Lift, Model 1070" and is further described in a brochure, a copy of which is submitted herewith as Exhibit A and made a part hereof. Suffice it to say that it comprises a platen with four air casters 18 and is separated from the platform by air motor operated scissor bars 116 for raising and lowering the platform in response to air motor activation. The platen is in turn provided with a steering handle for maneuvering of the entire unit over the floor.

Mounted to one side of the housing, about midway between the ends, is a panel 118 for mounting the buttons 120, 122, 124, 126, 128 and 130 for control of the various operations of the apparatus in proper sequence.

In operation, the float button 120 is operated to generate an air film on which the pallet 10 floats, to enable the assembly to be moved over the floor into endwise alignment with the roll 12 from which the core shaft 14 is to be withdrawn.

With the front end 28 of the saddle 20 in vertical alignment with a portion of the shaft 14 immediately forwardly of an exposed annular flange 132, normally present on the shaft, the air float button is operated to deenergize the air casters to enable the aligned pallet to rest on the floor.

Thereafter, the raise button 122 is operated to activate the air motor for driving the elevator means to raise the housing to a level at which the shaft 14 becomes seated in the groove 32 in advance of the annular flange 132.

The clamp button 130 is operated to actuate the air cylinder for rocking movement of the clamping bar 102 to engage the core 16 in clamping position.

The apparatus is now programmed for withdrawal of the shaft from the core. For this purpose, the pull button 126 is operated to activate the air motor 82 for lengthwise displacement of the upper run of the chain 66 and attached saddle 20 from forward to retracted position. In response to such linear displacement of the saddle, the front wall 28 of the saddle comes into engagement with the annular flange 132 on the shaft, whereby, in response to continued forward displacement of the saddle, the shaft is withdrawn from the core or from the roll in the absence of a core. Such movement is continued until the forward end of the shaft 14 clears the core 16. As the shaft 14 is being withdrawn from the core or roll, the portion of the withdrawn shaft rests upon the stationary plate 98 having a groove 136 in its upper edge for support of the shaft. As a result, the shaft is supported at all times between the saddle and the plate 134 during its withdrawal from the core or roll. Means, such as a variable limited switch 180, is provided to limit the travel of the saddle from its forward position to correlate the length of travel with the length of shaft so that displacement of the shaft will be stopped when the forward end clears the core and while the forward end portion is still supported by the plate 98. Instead, limit switches 180 and 182 can be located to be engaged when the saddle reaches the maximum forward and rearward positions of adjustment.

Upon reaching such limit in the travel of the saddle, the pull button is automatically operated to deenergize the air motor and the clamp button is operated to return the clamping bar from clamping position to retracted position to free the core 16 for removal.

Thereafter the withdrawn shaft can be lifted or pushed from the apparatus or displaced laterally from the saddle for movement over the inclined ledge 36 onto a storage table 138 alongside the housing having its supporting surface 139 in crosswise alignment with the upper edge of the side wall 26 of the saddle. Instead, the shaft can be inserted into a new core for use in forming a new roll of paper. For this purpose, the pallet and elevator are operated as before to bring the shaft into endwise alignment with the core. The clamping member is again actuated by the pneumatic cylinder to clamping position to grip the core. With the saddle now placed behind the annular flange 132 and with the forward end portion of the shaft 14 cradled in the recessed support plate 98, switch button 128 is operated for operating the air motor for reverse movement to effect chain operation for linear displacement of the saddle towards its forward position. Upon engagement of the saddle with the front face of the annular flange 132, continued reverse movement of the saddle will cause the shaft to be displaced forwardly over the plate 98 and into the core. When the saddle reaches its forward position, to make switch 182, the air motor is deenergized and the clamping bar 102 is returned to retracted position to release the core shaft.

The elements in FIG. 9 of the drawing will be described with reference to a non limiting representative set of conditions for operation of the apparatus of this invention. The numeral 150 is a directional control valve connected to regulator 152 set at about 90 PSI, while the numeral 154 indicates an air supply at a minimum of 60 PSI. 156 is a pressure regulator set at about 25 PSI, and 158 is a relay valve which communicates with the air casters 18 of the pallet 10.

Button 124 operates directional control valve 160 which communicates with a relay and directional control valve 162. Air motor 164 communicates with a hydraulic pump 166 which pumps fluid under pressure from a reservoir 168 to a hydraulic cylinder 170 to actuate the scissors 116 of the lift mechanism to raise the platform and housing.

Relief valve 174 limits the maximum pressure to cylinder 170, while valve 172 is a pilot operated check valve.

Flow control valve 210 limits the downward speed of cylinder 170 and check valve 212 holds the hydraulic fluid in cylinder 170 to maintain the lift mechanism in position of use. Pilot operated check valve 172 communicates with button 122 and directional control valve 176 for controlling the downward movement of the lift mechanism. The push, pull, lower and raise buttons are momentary contact buttons whereby operation sequence stops when the buttons are no longer depressed.

The clamp operating button 130 and directional control valve 178 communicates with a spring return air cylinder 108 for actuation of the clamping bar 102. The cylinder 108 communicates with a speed control muffler 177.

Forward and rearward movement of the saddle 20 is controlled by buttons 126 and 128 respectively. Directional control valve 178 communicates with limit switch 180 and through relay 182 controls the air motor 80 provided with a muffler 184 for speed control of the driving chains in one direction or the other. Directional control valve 186 communicates with the limit switch 188 at the rearward position, and relay 190 for effecting operation of the air motor in the reverse direction.

200 is an air exhaust manifold connected to the directional control valves and is provided with a drain cock 202 and exhaust muffler 204.

It will be understood that changes may be made in the details of construction, arrangement and operation, without departing from the spirit of the invention, especially as defined in the following claims.

We claim:

1. A portable shaft puller comprising an elongate housing having vertically disposed laterally spaced apart side walls,
    a saddle having vertically disposed crosswise extending front walls formed with a recessed portion extending downwardly from the upper edge dimensioned to enable a portion of the shaft to be received therein,
    means mounting the saddle above the side walls of the housing for movement of the saddle lengthwise of the housing between forward and rearward positions of adjustment,
    driving means within the housing comprising a reversible air motor,
    an operative connection between the driving means and the saddle for displacement of the saddle between forward and rearward positions of adjustment,
    a clamping means rigid with the housing forwardly of the forward position of adjustment of the saddle for releasably clamping a core thereby to restrain the core during insertion or withdrawal of the shaft,
    fixed support means between the clamping means and the forward position of adjustment of the saddle for support of portions of the shaft forwardly of said forward position of adjustment,
    means for moving the housing over a horizontal surface for positioning the saddle in vertical alignment with the shaft to be withdrawn or in alignment with the core into which a shaft is to be inserted,
    and air pressure operated lift means for raising and lowering the housing.

2. A shaft puller as claimed in claim 1 in which the housing includes a bottom wall extending crosswise between the side walls and which includes means for securing the bottom wall to the lift means.

3. A shaft puller as claimed in claim 1 in which the recessed portion in the front wall of the saddle is curvilinear in shape and is disposed midway between the lateral edges of the front wall.

4. A shaft puller as claimed in claim 1 which includes an operative connection between the side walls of the housing and the saddle for guiding the saddle during longitudinal movement relative to the housing between forward and rearward positions of adjustment.

5. A shaft puller as claimed in claim 4 in which the operative connection for supporting and guiding the saddle comprises a pair of laterally spaced apart guide grooves extending lengthwise of the housing, and a support plate on which the saddle is fixed with the lateral edges of the support plate in sliding engagement in the guide grooves.

6. A shaft puller as claimed in claim 1 in which the driving means further comprises a pair of longitudinally spaced sprockets, one of which is a driving sprocket and the other of which is an idler sprocket, an endless chain operating about said sprockets, means securing the saddle to the upper run of the chain, said reversible air motor operating the driving sprocket in turning movement.

7. A shaft puller as claimed in claim 6 which includes means for longitudinal movement of the idler sprocket for adjustment of chain tension.

8. A shaft puller as claimed in claim 1 in which the clamping means comprises an upright rigid with the housing, an elongate clamping lever pivoted intermediate its ends on the upright for rocking movement about the pivot between clamping and release positions, a cylinder and piston means pivotally secured at one end to a portion of the clamping lever offset from the pivot, and pivotally secured at the other end to a fixed bracket.

9. A shaft puller as claimed in claim 1 in which the support means comprises a vertically disposed crosswise extending plate rigid with the housing and a recess extending downwardly from the upper edge of the plate in endwise alignment with the recess in the saddle.

10. A shaft puller as claimed in claim 1 in which the means for moving the housing over the surface comprises an air pallet on which the housing is supported and means for generating an air film between the pallet and the surface for floating the air pallet on the surface, and means for guiding the floating pallet over the surface.

11. A shaft puller as claimed in claim 10 in which the lift comprises a platform on which the housing rests, scissor means between the platform and the air pallet, and means for actuating the scissor lift for vertical movement of the platform relative to the pallet.

12. A shaft puller as claimed in claim 1 which includes a stand to one side of the housing for storage of core shafts with the upper surface of the stand in crosswise alignment with the upper edge of the adjacent wall of the saddle.

13. A shaft puller as claimed in claim 1 which includes a panel with operating buttons alongside one side of the housing for operation of the various activating means.

* * * * *